United States Patent

[11] 3,595,330

| [72] | Inventor | Ernst Kuhnle<br>Balingen, Wurttenberg, Germany |
|---|---|---|
| [21] | Appl. No. | 788,447 |
| [22] | Filed | Jan. 2, 1969 |
| [45] | Patented | July 27, 1971 |
| [73] | Assignee | Bizerba-Werke Wilhelm Kraut Kg<br>Balingen am Wurttenberg, Germany |
| [32] | Priority | Jan. 8, 1968 |
| [33] | | Germany |
| [31] | | P 15 74 530.9 |

[54] MULTIPLE LEVER PENDULUM BALANCE
8 Claims, 4 Drawing Figs.

[52] U.S. Cl............................................. 177/224,
177/258, 177/261
[51] Int. Cl............................................. G01g 1/02
[50] Field of Search........................................ 177/216,
224, 246, 251, 261, 256—259

[56] References Cited
UNITED STATES PATENTS

| 3,189,111 | 6/1965 | Ast.............................. | 177/246 X |
| 3,217,820 | 11/1965 | Ast.............................. | 177/246 X |

FOREIGN PATENTS

| 326,300 | 3/1930 | Great Britain................ | 177/246 |
| 895,065 | 9/1953 | Germany....177/SCALE BEARINGS |
| 342,277 | 7/1936 | Italy............................ | 177/216 |

*Primary Examiner*—Richard B. Wilkinson
*Assistant Examiner*—George H. Miller, Jr.
*Attorney*—Christen, Sabol and O'Brien ABSTRACT: A multiple lever balance having a main lever supported on a main knife edge, a load input knife edge supported on the main lever, a lever having a load to be weighed applied thereto, a horizontally disposed weighing plate connected with the load input knife edge, and a force member connected with the weighing lever and in rolling contact with the weighing plate to assure that horizontal forces are applied vertically to the load input knife edge.

MULTIPLE LEVER PENDULUM BALANCE

BACKGROUND OF THE INVENTION

The present invention pertains to balances and more particularly to multiple lever balances having a weighing load applied to a load input knife edge on a main lever.

The accuracy of multiple lever balances is desirably increased by using finely graduated scales of 10,000ths and finer; however, such finely graduated scales can only be constructed in practice by mathematical calculation or geometric division. Such scales, however, are not warranted by conventional balances because the pointers of conventional balances are subjected to imprecise forces due to the load not being applied completely vertically to the main lever. That is, when using levers along with the main lever oblique forces are transmitted to the main lever to cause improper movement.

Conventional multiple lever balances may have accurate scales associated therewith. However, such scales must be empirically produced, and if the lever system ahead of the main lever is altered to change the weighing capacity of the balance, a new scale must be empirically produced which is highly undesirable.

SUMMARY OF THE INVENTION

Accordingly, it is an object of the present invention to construct a multiple lever balance that may be accurately used with mathematically or geometrically produced scales.

Another object of the present invention is to increase the accuracy of a multiple lever balance by applying weighing forces to a load input knife edge in a vertical direction only.

The present invention has another object in that a force member having an arcuate end surface is utilized to transmit load force to the main lever of a balance.

A further object of the present invention is to utilize a force member including a pair of stilts having arcuate end surfaces to transmit load force in a multiple lever balance.

One of the advantages of a balance constructed in accordance with the present invention is that scales may be used therewith that are finely graduated to provide accurate weighing. Another advantage of the present invention is the increase in overall balance accuracy provided by the use of force members having arcuate ends.

The present invention is generally characterized in a multiple lever balance including a main lever supported on a main knife edge and supporting a load input knife edge, a weighing lever adapted to have a load to be weighed applied thereto, a horizontally disposed plate connected with the load input knife edge, and a force member connected at one end with the weighing lever and at the other end being in rolling contact with the weighing plate whereby horizontal forces applied to the load input knife edge are vertical.

Other objects and advantages of the present invention will become apparent from the following description of the preferred embodiments as shown in the drawings.

Figure 1:
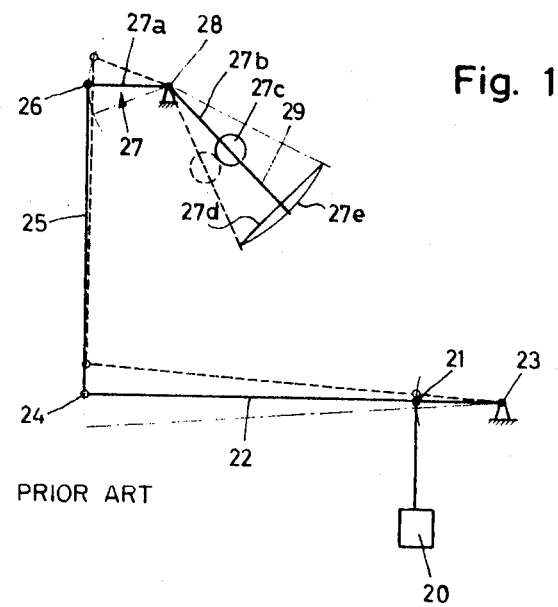
FIG. 1 is a schematic representation of a conventional multiple lever balance.

A conventional multiple lever balance is illustrated in FIG. 1 with all bearing and linkage points being schematically represented.

In FIG. 1 a load 20 to be weighed is suspended on a knife edge bearing 21 of a weighing lever 22. Weighing lever 22 is supported on a balance frame (not shown) by means of a knife edge bearing 23. A knife edge bearing 24 attached to the free end of weighing lever 22 holds a member 25 which is suspended from a load input knife edge 26 supported on the free end of a lever arm 27a of a main lever 27 which also includes a lever arm 27b. Main lever 27 is pivotally supported on a main knife edge 28, and a poise 27c and a pointer 29 are secured to lever arm 27b such that pointer 29 sweeps over scales 27d and 27e.

As a result of the necessarily different distances between knife edge bearings 26 and 28 on main lever 27 and knife edge bearings 23 and 24 on weighing lever 22, main lever 27 and weighing lever 22 are given different angular deflections, and knife edge bearings 24 and 26 of these levers move on circular arcs of different lengths. The result is that member 25 has a rotating motion and does not always apply the weighing load vertically to knife edge bearing 26. Since the weighing load is not applied in a direct vertical manner to main lever 27 but rather with a horizontal component from weighing lever 22, it is not possible to accurately calculate scales 27d and 27e mathematically or to construct them geometrically, when the requirements for weighing accuracy exceed a certain value.

Figure 2:
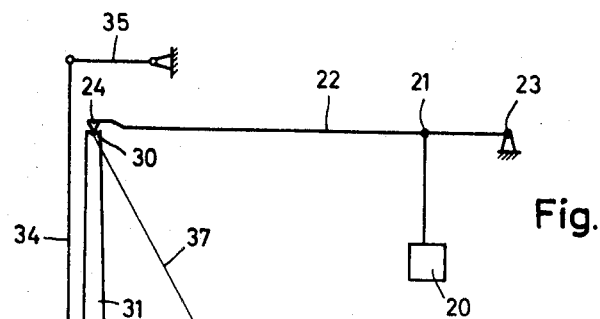
FIG. 2 is a schematic representation of a first embodiment of a multiple lever balance according to the present invention in a first weighing position.
Figure 3:
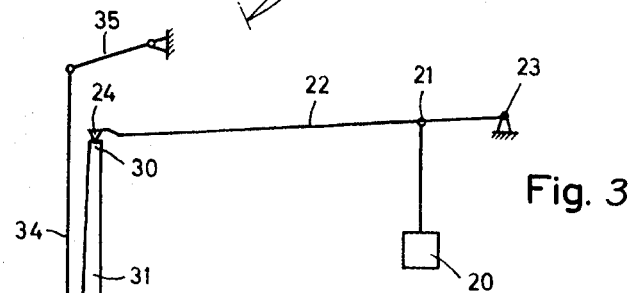
FIG. 3 is a schematic representation of the balance of FIG. 3 in a second weighing position.

A first embodiment of a balance according to the present invention in which the weighing load is applied vertically to the main lever to permit the use of scales obtained mathematically or geometrically, is illustrated in FIGS. 2 and 3. In describing the embodiments of FIGS. 2 and 3, parts that are identical to parts shown in FIG. 1 are given identical reference numerals. A load 20 is applied by means of a knife edge bearing 21 to a weighing lever 22 which is supported on a balance frame (not shown) through a knife edge bearing 23. At the free end of weighing lever 22 a knife edge 24 is disposed which lies with its edge in a seat 30 of a force member 31. The lower end 32 of force member 31 has a cylindrical rolling surface in contact with a plate 33. The axis of the cylindrical rolling surface at end 32 of force member 31 coincides with the edge of knife edge 24, and the radius 37 of the rolling surface is therefore equal to the length of force member 31. The rolling surface imparts to force member 31 the neutral quality of a wheel rolled on the horizontal surface of plate 33 having an axis of rotation at knife edge 24.

An arm 36 extends downward at a right angle from plate 33 and has a seat at its lower end to connect plate 33 with a load input knife edge 26 disposed at the end of a main lever 27 which is connected with a pointer 29 that sweeps over scales 27d and 27e. Plate 33 is rigidly connected to an extension member 34 that is connected with a conventional parallelogram linkage 35 attached to the framework of the balance to thereby maintain plate 33 exactly horizontal.

In spite of the different horizontal motion components of knife edges 24 and 26 during weighing of a load, the weighing load always acts in a vertical direction only on knife edge bearing 26 since force member 31 can roll on plate 33 to compensate for the difference in movement of weighing lever 22 and main lever 27.

The rolling movement of force member 31 causes a shifting point of application of the load on plate 33; however, the moment arising therefrom is compensated by a force couple which acts in the direction of parallelogram linkage 35 in a conventional manner such that no residual vertical components arise to adversely influence the indicated weight.

Force member 31 is supported in such a manner on plate 33 that it can carry out its rolling function, but such that it is secured against unintentional shifting. This may be accomplished by means of a guide or a rail.

Figure 4:
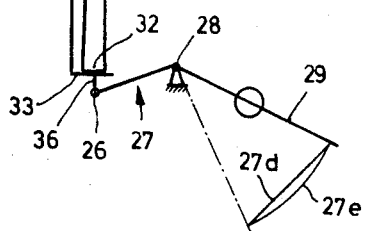
FIG. 4 is a partial elevational view of a second embodiment of a balance according to the present invention.
Figure 4:
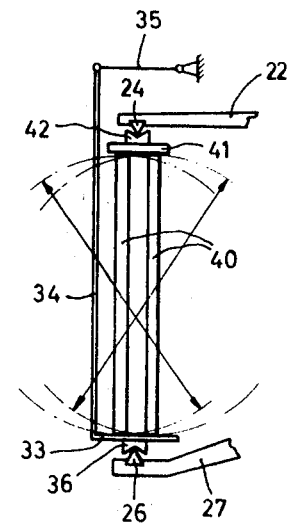

A second embodiment of a balance according to the present invention is shown in FIG. 4 and parts thereof that are identical to parts of the embodiment of FIGS. 2 and 3 are given identical reference numerals. In place of force member 31, two force transmitting stilts 40 are provided, and the two ends of each stilt 40 are spherically arcuate with the diameter of the spherical surface equal to the length of a stilt. While the lower arcuate ends of stilts 40 which may be balls are supported on plate 33, the stilts carry a flat top plate 41 on their upper arcuate ends which may be balls. On top plate 41 there is attached a seat 42 in which knife edge 24 of weighing lever 22 engages. The two stilts 40 are secured in a conventional manner against lateral shifting on top plate 41 and on plate 33 but are unhampered in their rolling motion. Stilts 40 act neutrally, like member 31 of FIGS. 3 and 4, and permit only vertical forces to act on load input knife edge 26 of main lever 27.

A solution equivalent to that in FIG. 2 would also be obtained if plate 33 was disposed so as to interact with knife edge 24 of weighing lever 22 instead of with knife edge 26 of lever 27, in which case it is noted that force member 31 should be inverted.

As previously mentioned the essential advantage of the balance according to the present invention, in which the weighing load is always applied vertically to the main lever, is that a scale constructed mathematically or geometrically can be used, which scale can be made very accurate, for example with graduations in 10,000ths to provide an exact indication of the weight of a load independent of the number of weighing levers or oblique trains connected ahead of the main lever. The main lever may be connected with the proposed vertical application of the weighing force and the associated mathematically or geometrically obtained scale as a kind of "measuring head" with any desired weighing lever systems.

In as much as the present invention is subject to many variations, modifications and changes in detail, it is intended that all matter described in the foregoing specification or shown in the accompanying drawings shall be interpreted as illustrative and not in a limiting sense.

What I claim is:

1. A multiple lever balance for determining the weight of a load comprising a main knife edge; a main lever supported on said main knife edge and having two arms; a weighing lever adapted to have the load to be weighed applied thereto; a load input knife edge disposed on one arm of said main lever; the other arm of said main lever carrying an inclination poise and cooperating with a scale for indicating the weight of the load to be weighed; a horizontal plate member connected with said input knife edge; means connected with said horizontal plate member for maintaining said horizontal plate member in a horizontal position regardless of the force applied thereto; and a force member having a first end connected with said weighing lever and a second end having an arcuate surface disposed in rolling contact with said horizontal plate member regardless of the position of said plate member whereby weighing forces applied to said load input knife edge are always vertical.

2. The invention as recited in claim 1 wherein said means for maintaining said weighing plate in a horizontal position includes a parallelogram linkage.

3. The invention as recited in claim 1 wherein said first end of said force member includes a bearing seat, and said weighing lever includes a knife edge connecting with said bearing seat.

4. The invention as recited in claim 3 wherein said arcuate surface of said second end of said force member includes a cylindrical rolling surface.

5. The invention as recited in claim 4 wherein the radius of said cylindrical rolling surface is the length of said force member.

6. The invention as recited in claim 3 wherein said force member includes a pair of stilts disposed in parallel, said stilts having arcuate upper ends at said first end of said force member, said force member includes a flat plate supported on said arcuate upper ends of said stilts and carrying said bearing seat, and said pair of stilts have arcuate lower ends constituting said arcuate surface of said second end of said force member.

7. The invention as recited in claim 6 wherein said arcuate upper ends and said arcuate lower ends of said pair of stilts include spherical rolling surfaces.

8. The invention as recited in claim 7 wherein the diameter of said spherical rolling surfaces is equal to the length of said pair of stilts.